US010994239B2

(12) United States Patent
Sano et al.

(10) Patent No.: US 10,994,239 B2
(45) Date of Patent: May 4, 2021

(54) SPIRAL GAS ADSORPTION APPARATUS AND METHOD OF USING THE SAME

(71) Applicant: SANDISK TECHNOLOGIES LLC, Plano, TX (US)

(72) Inventors: Michiaki Sano, Yokkaichi (JP); Jo Sato, Yokkaichi (JP)

(73) Assignee: SANDISK TECHNOLOGIES LLC, Addison, TX (US)

(*) Notice: Subject to any disclaimer, the term of this patent is extended or adjusted under 35 U.S.C. 154(b) by 257 days.

(21) Appl. No.: 15/915,252

(22) Filed: Mar. 8, 2018

(65) Prior Publication Data
US 2019/0275459 A1 Sep. 12, 2019

(51) Int. Cl.
*B01D 53/06* (2006.01)
*B01D 53/04* (2006.01)
*B01J 20/14* (2006.01)
*B01J 20/06* (2006.01)

(52) U.S. Cl.
CPC .......... *B01D 53/0454* (2013.01); *B01J 20/06* (2013.01); *B01J 20/14* (2013.01); *B01D 2313/40* (2013.01)

(58) Field of Classification Search
CPC ............... B01D 53/04; B01D 53/0407; B01D 53/0454; B01D 53/06; B01D 2257/20; B01D 2258/0216; B01D 2313/40; B01J 20/041; B01J 20/043; B01J 20/06; B01J 20/08; B01J 20/12; B01J 20/14; B01J 20/20
USPC ............ 95/107, 131, 132, 142; 96/138, 139, 96/150–152; 198/467.1, 625, 657
See application file for complete search history.

(56) References Cited

U.S. PATENT DOCUMENTS

| | | | | |
|---|---|---|---|---|
| 3,735,563 | A | * 5/1973 | Adams .................. | B01D 53/26 96/127 |
| 4,122,149 | A | 10/1978 | Dunnery et al. | |
| 4,170,628 | A | 10/1979 | Kosseim et al. | |
| 4,192,418 | A | * 3/1980 | Montgomery ....... | B65G 33/265 198/657 |
| 4,237,620 | A | * 12/1980 | Black .................... | B01D 53/18 261/79.2 |
| 4,370,152 | A | 1/1983 | Luper | |
| 4,717,401 | A | * 1/1988 | Lupoli ............... | B01D 53/0446 96/141 |
| 5,286,282 | A | * 2/1994 | Goodell ............... | B60T 17/004 96/113 |
| 5,320,816 | A | 6/1994 | Tasai et al. | |
| 5,419,877 | A | * 5/1995 | Goforth .............. | B01D 49/006 23/313 R |

(Continued)

FOREIGN PATENT DOCUMENTS

| | | |
|---|---|---|
| EP | 3108960 A1 | 12/2016 |
| SU | 1063443 A * | 12/1983 |
| SU | 1223974 A * | 4/1986 |

OTHER PUBLICATIONS

Machine-generated English translation of SU 1223974 A, published Apr. 1986.*

(Continued)

*Primary Examiner* — Frank M Lawrence, Jr.
(74) *Attorney, Agent, or Firm* — The Marbury Law Group

(57) ABSTRACT

A gas scrubber includes a canister having a rotatable spiral separator which provides a non-linear path configured to be filled with modular adsorbent material portions between a gas inlet and a gas outlet.

6 Claims, 4 Drawing Sheets

(56) References Cited

U.S. PATENT DOCUMENTS

| | | | |
|---|---|---|---|
| 5,425,924 A * | 6/1995 | Finley | B01J 8/008 |
| | | | 422/176 |
| 5,814,129 A * | 9/1998 | Tentarelli | B01D 53/0431 |
| | | | 95/90 |
| 6,002,133 A | 12/1999 | Nelson et al. | |
| 6,842,221 B1 | 1/2005 | Shiraishi | |
| 7,318,854 B2 | 1/2008 | Sirkar | |
| 8,414,690 B2 * | 4/2013 | Hansen | B01D 53/0438 |
| | | | 95/115 |
| 9,504,797 B2 | 11/2016 | Tham | |
| 2005/0147530 A1 | 7/2005 | Kang et al. | |
| 2006/0090644 A1 | 5/2006 | Sirkar | |
| 2006/0230930 A1 * | 10/2006 | Knaebel | B01D 53/0462 |
| | | | 95/96 |
| 2015/0182711 A1 | 7/2015 | Tham | |

OTHER PUBLICATIONS

Maching-generated English translation of SU 1063443 A, published Dec. 1983.*

* cited by examiner

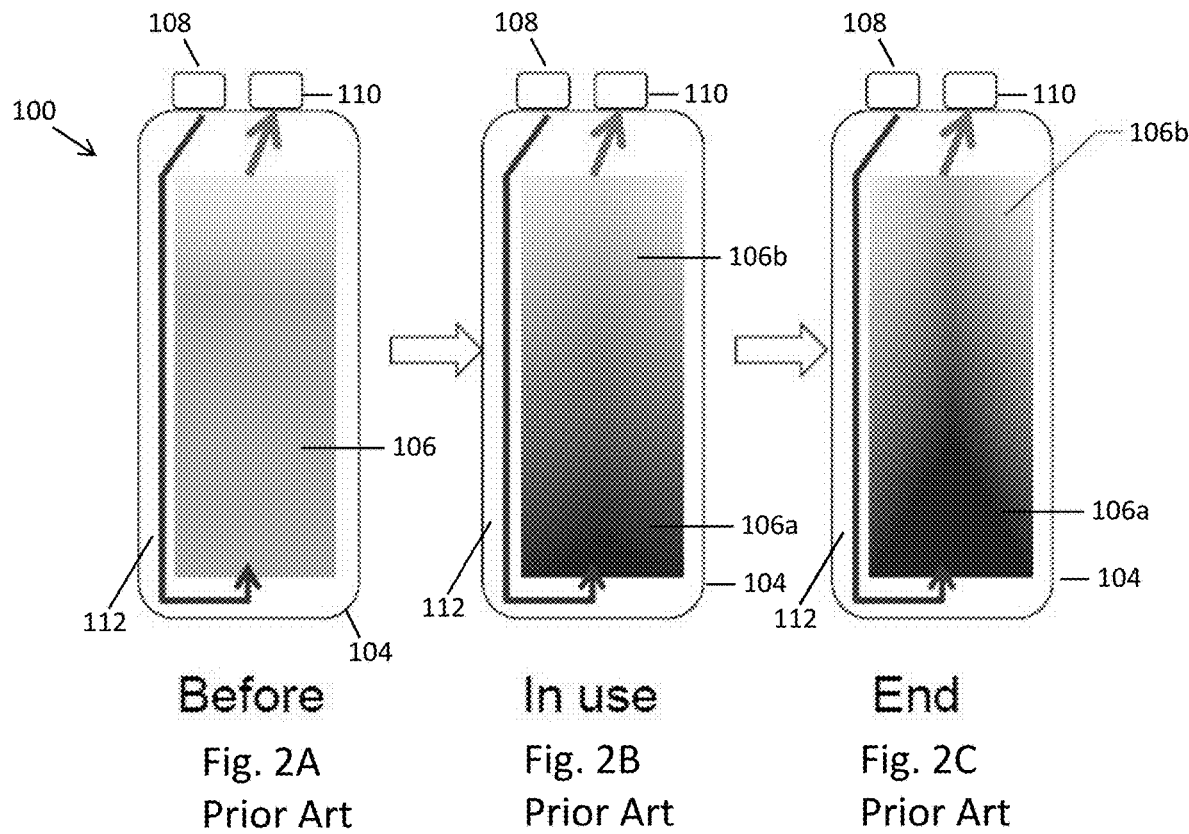
Before
Fig. 2A
Prior Art
In use
Fig. 2B
Prior Art
End
Fig. 2C
Prior Art
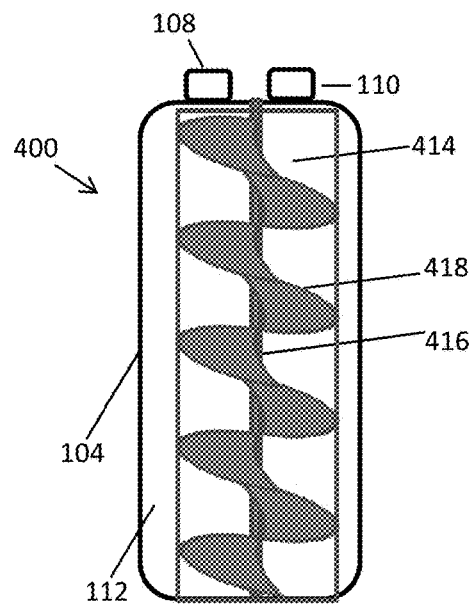
Fig. 3

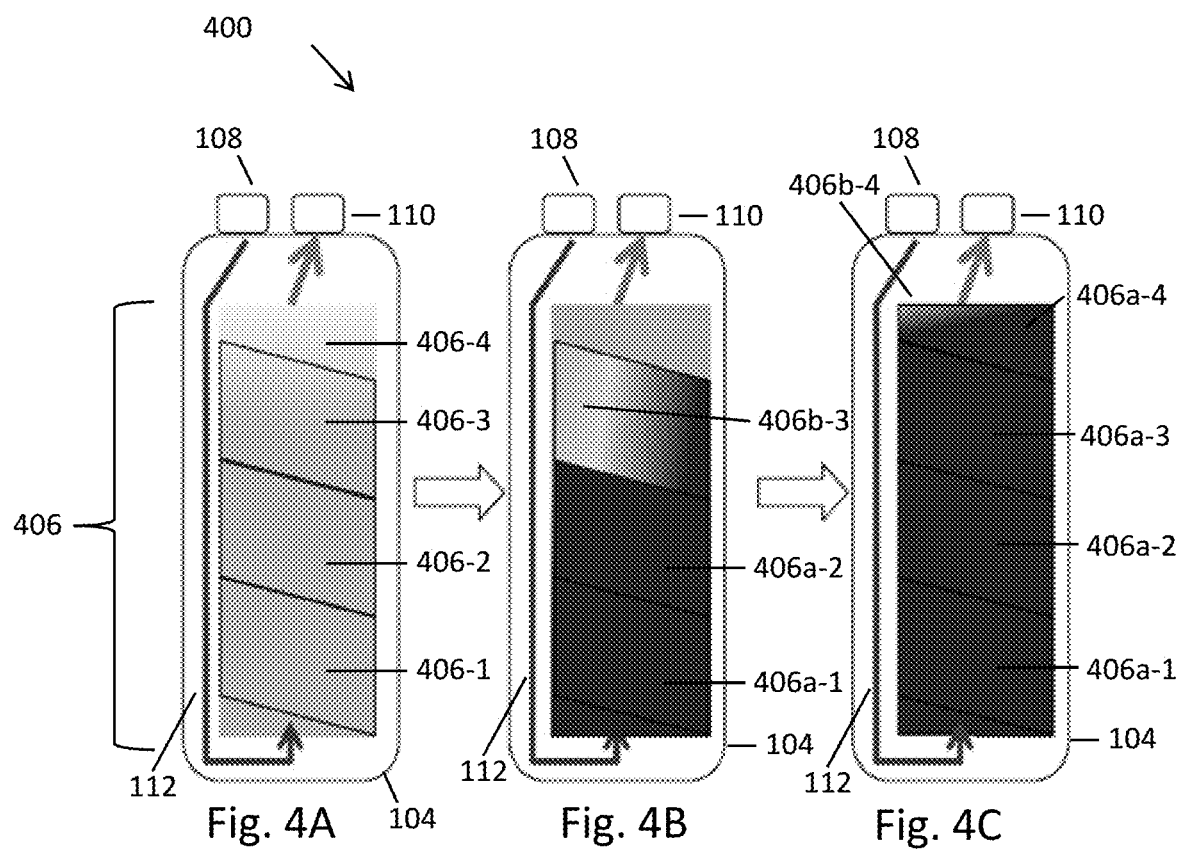
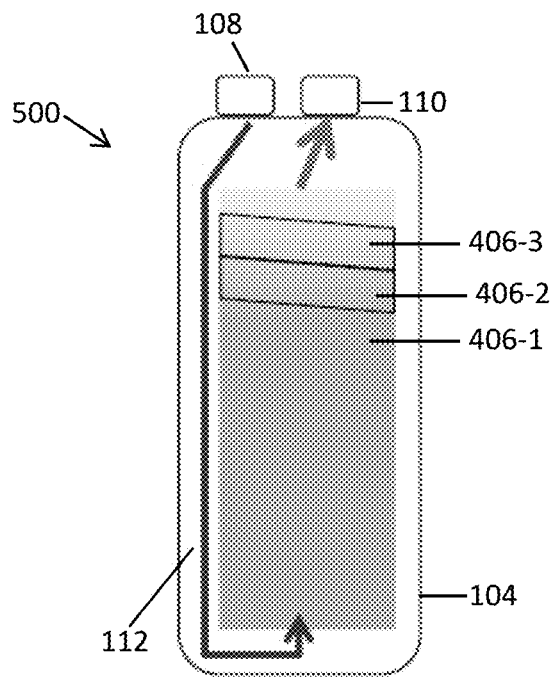
Fig. 5

SPIRAL GAS ADSORPTION APPARATUS AND METHOD OF USING THE SAME

FIELD

The present disclosure is generally directed to fabrication of semiconductor devices and specifically to the adsorption of halogen process gases used in the fabrication of semiconductor devices.

BACKGROUND

In the manufacture of semiconductor devices, sequences of thin film deposition and etching steps are performed. Process gases including halogens are often used in these steps. Common semiconductor processes which may use halogen gases include etching or layer deposition, such as chemical vapor deposition (CVD) and atomic layer deposition (ALD).

Although useful for the production of semiconductor devices, halogen containing gases are typically toxic and cannot be released into the atmosphere. Therefore, the exhaust gases are typically processed to remove the halogen containing gases from the exhaust gases before venting the exhaust gases to the atmosphere.

SUMMARY

An embodiment is drawn to a gas scrubber, including a canister having a rotatable spiral separator which provides a non-linear path configured to be filled with modular adsorbent material portions between a gas inlet and a gas outlet.

Another embodiment is drawn to a method of loading an absorbent material in a canister including providing a canister having spiral separator which provides a non-linear path between a gas inlet and a gas outlet, placing a first modular adsorbent material portion onto the spiral separator adjacent to an opening in the canister and rotating the spiral separator move the first modular adsorbent material portion away from the inlet of the canister. After the step of rotating, the method includes placing a second modular adsorbent material portion onto the spiral separator adjacent to the inlet of the canister and rotating the spiral separator move the second modular adsorbent material portion away from the opening in the canister.

Another embodiment is drawn to a method of unloading an absorbent material in a canister including providing a canister having spiral separator which provides a non-linear path filled with modular adsorbent material portions between a gas inlet and a gas outlet and rotating the spiral separator to move each modular adsorbent material portion toward the opening in the canister and sequentially removing each modular adsorbent material portions from the canister through the opening.

Another embodiment is drawn to a method of scrubbing halogen gas from an etching or deposition chamber including passing halogen containing exhaust gas from the etching or deposition chamber through a canister containing a sorbent material and at least one partition, such that the at least one partition in the canister forces the halogen containing exhaust gas through the sorbent material in at least two directions.

BRIEF DESCRIPTION OF THE DRAWINGS

FIGS. 2A-2C are schematic diagrams illustrating the operation of a conventional gas scrubber.

FIG. 3 is a schematic see-thru diagram illustrating the internal components of a gas scrubber according to an embodiment.

FIGS. 4A-4C are schematic diagrams illustrating the operation of the gas scrubber of FIG. 3.

FIG. 5 is a schematic diagram illustrating a gas scrubber according to another embodiment.

DETAILED DESCRIPTION

As discussed above, halogen containing gases used for semiconductor processing are typically toxic and cannot be released into the atmosphere. Therefore, the exhaust gases are typically processed to remove the halogen containing gases from the exhaust gas before venting to the atmosphere.

Figure 1:
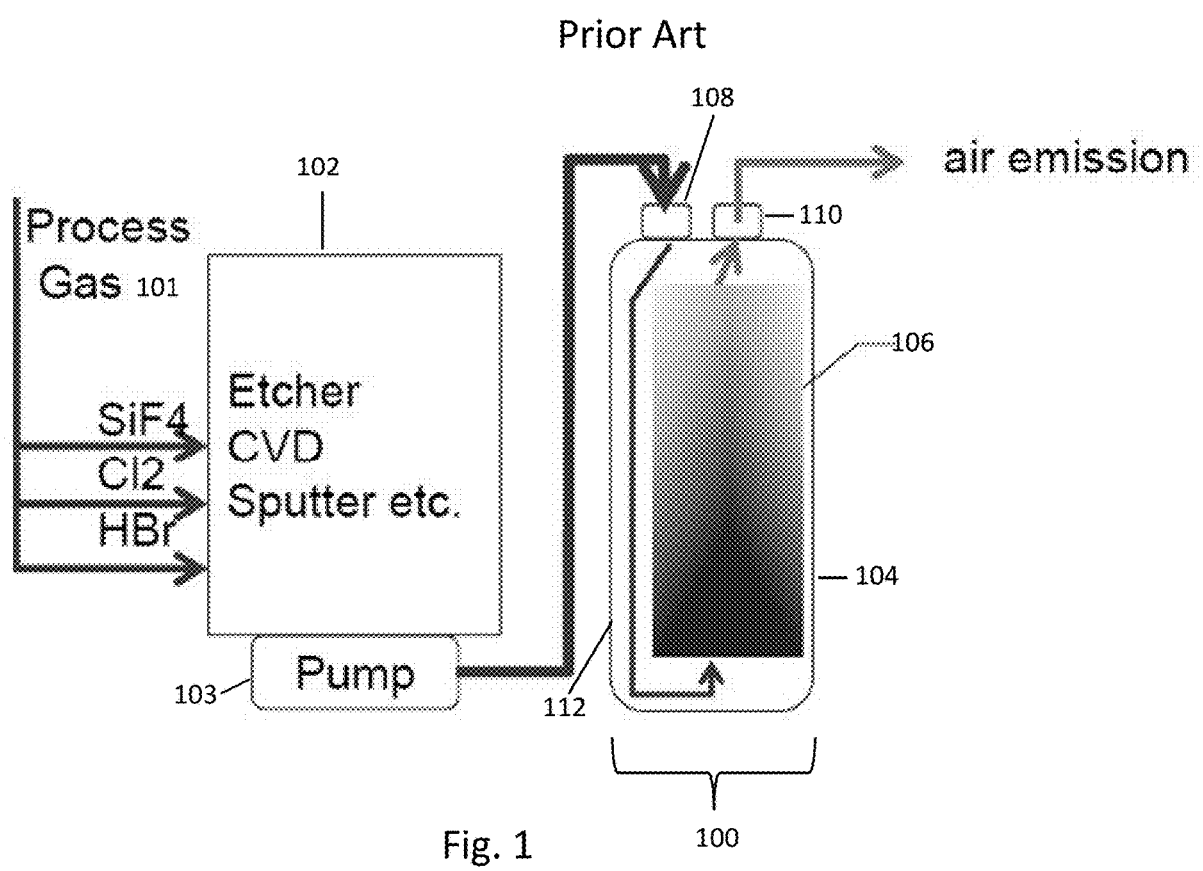
FIG. 1 is a schematic illustration of a semiconductor process apparatus operably connected to a conventional gas scrubber.

FIG. 1 illustrates a semiconductor process apparatus 102 operably connected to a conventional gas scrubber 100. Process gases 101, such as $SiF_4$, $SiCl_4$, $CF_4$, $Cl_2$, $Br_2$, HBr, HI, HCl, $NF_3$, $SiH_2Cl_2$, $CH_3CCl_3$ or mixtures thereof are provided to the semiconductor process apparatus 102. The semiconductor process apparatus 102 may be used to conduct semiconductor processes such as etching or layer deposition, such as chemical vapor deposition (CVD) or atomic layer deposition (ALD). Unused halogen containing process gases 101 are pumped from the apparatus 102 with a pump 103 to the gas scrubber 100. The gas scrubber 100 comprises at least one canister 104 filled with a sorbent material 106, a gas inlet 108 and a gas outlet 110. The gas inlet 108 and the gas outlet 110 are typically located on a top portion of the canister 104. Halogen containing process gases 101 are typically directed though the inlet into a channel 112 which directs the halogen containing process gases 101 to a bottom portion of the canister 104. The halogen containing process gases 101 are then directed up through the sorbent material 106 which adsorbs and/or absorbs the halogen containing process gases 101, thereby separating the halogen containing process gases 101 from the inert carrier gases, such as nitrogen or argon. The scrubbed inert carrier gasses may then be vented to the atmosphere or recycled for later use.

FIGS. 2A-2C illustrate the operation of a conventional gas scrubber 100 such as the conventional gas scrubber 100 illustrated in FIG. 1. As illustrated in FIG. 2A, before providing any halogen containing process gases 101, the sorbent material 106 in the canister 104 is fresh. That is, all of the sorbent material 106 is available to adsorb and/or absorb halogen containing process gases 101. FIG. 2B illustrates the state of the conventional gas scrubber 100 while in use. The sorbent material 106 begins to adsorb and/or absorb the halogen containing process gases 101 at the bottom of the column of sorbent material 106 forming a portion 106a of spent sorbent material at the bottom of the column of sorbent material 106. Above the portion 106a of spent sorbent material is a portion 106b of unused sorbent material. As illustrated in FIG. 2C, as the column of sorbent material 106 nears the end of its useful life, a portion 106b of unused sorbent material remains due to the design of the conventional gas scrubber 100. This is because the halogen containing process gases 101 can escape through the outlet 110 without traversing the outer edges of the portion 106b of unused sorbent material. Sorbent materials include, but are not limited to, activated carbon, calcium hydroxide, calcium carbonate, calcium oxide, calcium aluminate, aluminium hydroxide, aluminium oxide, nickel oxide, nickel carbonate, nickel hydroxide, boehmite, diatomaceous earth, attapulgite or mixtures thereof.

FIG. 3 illustrates an embodiment of a gas scrubber 400 and FIGS. 4A-4C illustrate the operation of an embodiment of gas scrubber 400 which is configured to overcome the deficiencies of the conventional gas scrubber 100. The gas scrubber 400 of this embodiment includes a canister 104 with an inlet 108 and an outlet 110. In an embodiment, the inlet 108 and the outlet 110 are located in a top portion of the canister 104. However, the inlet 108 and the outlet 110 may be located anywhere on the canister, such as on a side portion or a lower portion of the canister 104.

As illustrated in FIG. 3, the gas scrubber 400 of this embodiment includes a spiral separator 414 located within the canister 104. The spiral separator 414 has a central rod 416 supporting a helical blade 418 which may continuous or discontinuous. A continuous helical blade 418 is a single blade wraps around the central rod 416. A discontinuous helical blade 418 comprises multiple blades which when assembled around the central rod 416 form a helix. The helical blade 418 draws up material from the bottom when rotated in one direction and can push material down from the top if rotated in the opposite direction. As illustrated in FIG. 4A, the column of sorbent material 406 is separated into discrete, modular portions 406-1, 406-2, 406-3, 406-4 by the spiral separator 414. The portions 406-1, 406-2, 406-3, 406-4 are blocks of sorbent material located on respective portions of the helical blade 418 of the spiral separator 414.

As illustrated in FIG. 4B, the halogen containing process gases 101 are provided to the canister 104 via the inlet 108. In this embodiment, the halogen containing process gases 101 flow through channel 112 to the bottom of the canister 104. In this embodiment, the halogen containing process gases 101 are first provided to the lowest portion 406-1 of the sorbent material. As illustrated in FIG. 4B, saturation of the lowest portion 406-1 results in a spent portion 406a-1 of sorbent material. As more halogen containing process gases 101 are provided, successive portions 406-2, 406-3 of the sorbent material become spent portions 406a-2, 406a-3. As illustrated in FIG. 4C, at the end of the process only a small unused section 406b-4 of the topmost portion 406-4 of the sorbent material remains, while a bottom section of portion 406a-4 is spent.

The helical shape of the spiral separator 414 forces process gases 101 to flow through the sorbent material in two directions, radial and up. The spiral separator 414 thereby provides a longer, tortuous path through the sorbent column More of the sorbent material is thereby utilized because of the longer path through the sorbent material.

FIG. 5 illustrates a gas scrubber 500 according to another embodiment. This embodiment is similar to the embodiment illustrated in FIGS. 3 and 4A-4C. However, in this embodiment, unused portions of sorbent material 406-1 to 406-3 are smaller, i.e., thinner, than the unused portions of sorbent material illustrated in the embodiment of FIGS. 3 and 4A-4C.

In this embodiment, new, unused portions of sorbent material 406-3 are added to the canister 104 while spent portions of sorbent material 406a-1 are removed from the canister 104. That is, an embodiment is drawn to a method of loading an absorbent material in a canister 104 which includes providing a canister 104 having spiral separator 414 which provides a non-linear path between a gas inlet 108 and a gas outlet 110, placing a first modular adsorbent material portion 406-2 onto the spiral separator 414 adjacent to an opening in the canister 104 and rotating the spiral separator 414 to move the first modular adsorbent material portion 406-2 away from the inlet of the canister. After the step of rotating, the method includes placing a second modular adsorbent material portion 406-3 onto the spiral separator 414 adjacent to the inlet 108 of the canister 104 and rotating the spiral separator 414 to move the second modular adsorbent material portion 406-3 away from the opening in the canister 104. These method steps are repeated until the canister 104 is filled. Another method is drawn to a method of unloading an absorbent material 406a-1 in a canister 104 which includes providing a canister 104 having spiral separator 414 which provides a non-linear path filled with modular adsorbent material portions 406-1, 406-2, 406-3 between a gas inlet 108 and a gas outlet 110 and rotating the spiral separator 414 to move each modular adsorbent material portion 406-1, 406-2, 406-3 toward the opening in the canister and sequentially removing each modular adsorbent material portions 406-1, 406-2, 406-3 from the canister 104 through the opening.

In an embodiment, the gas scrubber 400 is configured to remove spent modular adsorbent material portions 406a-1, 406a-2, 406a-3 from one end of the gas scrubber 400 and provide new modular adsorbent material portions 406-3, 406-2, 406-1 from an opposing end of the gas scrubber 400. For example, openings (not shown) can be provided on both the top and bottom of the canister 104. In an embodiment, new sorbent material can be provided to the canister 104 via the top opening and spent sorbent material can be removed via the bottom opening. In an alternative embodiment, new sorbent material can be provided to the canister 104 via the bottom opening and spent sorbent material can be removed via the top opening. In an embodiment, the openings in the canister 104 are provided in the sidewall of the canister 104. The openings are provided in respective top and bottom portions of the sidewall of the canister 104. Alternatively, the top opening can be in the top surface of the cylinder and/or the bottom opening can be in the bottom surface of the cylinder instead of in the sidewall. In this embodiment, new sorbent material can be provided to the canister 104 proximal to the gas inlet 108 and spent sorbent material removed proximal to the gas outlet 110.

Figures 6A, 6B, 6C:
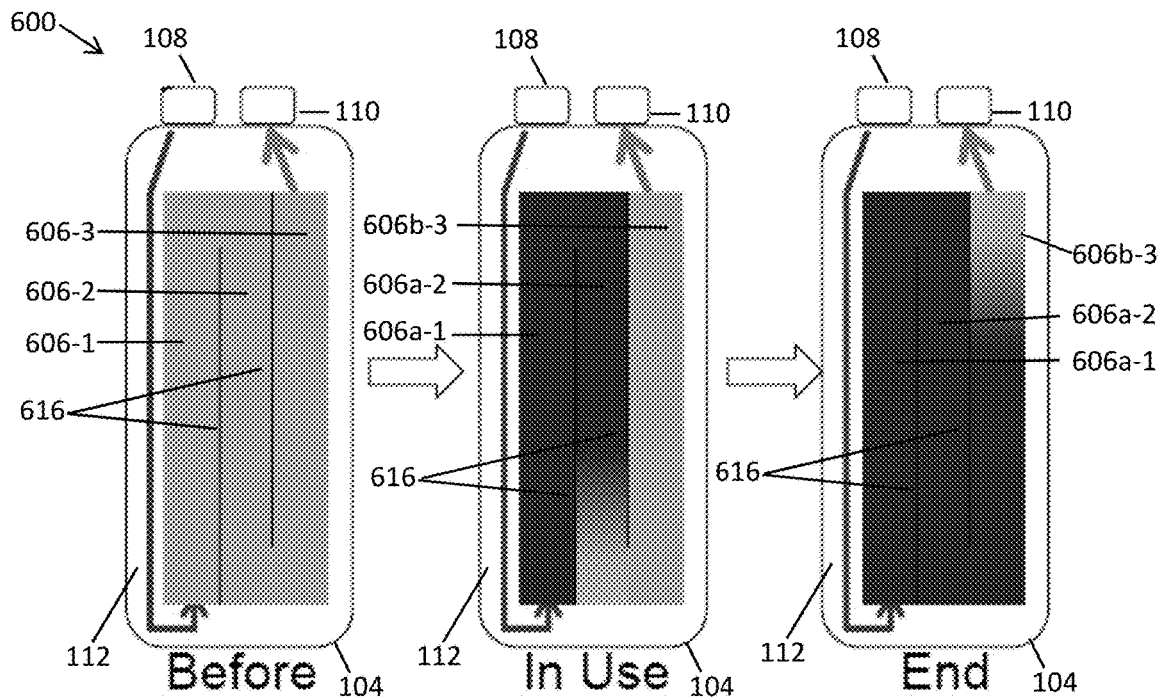
FIGS. 6A-6C are schematic diagrams illustrating the operation of a gas scrubber according to another embodiment.

FIGS. 6A-6C illustrate the operation of a gas scrubber 600 according to another embodiment. In this embodiment, a series of vertically oriented interdigitated walls 616 are provided in the interior of the canister 104 to increase the length of the gas path from the inlet 108 to the outlet 110 in the canister 104. As can be seen in FIG. 6B, the halogen containing process gases 101 flowing through a first portion 606-1 of the sorbent material results in formation of a first spent portion 606-a1 of sorbent material. As more halogen containing process gases 101 are provided to the gas scrubber 600, a second portion 606-2 of the sorbent material becomes saturated with the halogen containing process gases 101 resulting in the formation of a second spent portion 606a-2 of the sorbent material. As illustrated in FIG. 6C, the process continues until there is only a small, unused portion 606b-3 of the last portion 606-3 remaining. The vertically oriented interdigitated walls 616 force the process gases 101 to flow in two directions, up and down, through the sorbent material.

Figures 7, 8, 9:
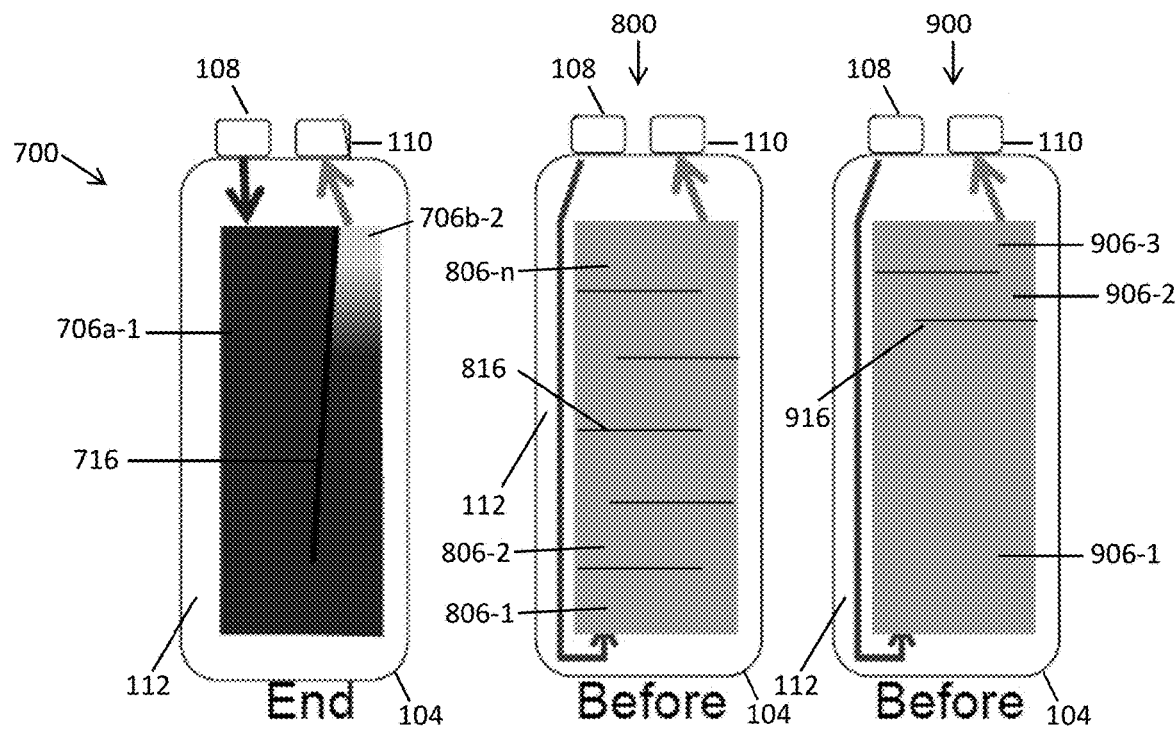
FIG. 7 is schematic diagrams illustrating the operation of a gas scrubber according to another embodiment.
FIG. 8 is a schematic diagram illustrating a gas scrubber according to another embodiment.
FIG. 9 is a schematic diagram illustrating a gas scrubber according to another embodiment.

FIG. 7 illustrates the operation of a gas scrubber 700 according to another embodiment. In this embodiment, a single vertical internal wall 716 is provided to in the canister 104 to increase the length of the gas path from the inlet 104 to the outlet 110. In this embodiment, the single internal vertical wall 716 is not oriented parallel to the sidewalls of the canister 104 as in the previous embodiment. Rather, the single internal vertical wall is oriented at an angle between 0 and 90 degrees, such as between 10 and 80 degrees, with respect to the sidewall of the canister 104 such that the area adjacent in the inlet 108 is larger than the area adjacent the outlet 110. The reduction in area adjacent the outlet 110 results in a reduction of the unused (unusable) portion 706b-2 of the sorbent material. In an embodiment, two or more internal vertical walls 716 are provided. The internal vertical wall(s) 716 force the process gases 101 to flow in two directions, diagonal down and diagonal up through the sorbent material, thereby increasing the path length and time flowing through the sorbent material.

FIG. 8 illustrates a gas scrubber 800 according to another embodiment. In this embodiment, a series of horizontally oriented interdigitated walls 816 are provided in the interior of the canister 104 to increase the length of the gas path from the inlet 108 to the outlet 110 in the canister 104. Similar to the embodiment illustrated in FIGS. 6A-6B, the halogen containing process gases 101 flowing through a first portion 806-1 of the sorbent material results in formation of a first spent portion of sorbent material. As more halogen containing process gases 101 are provided to the gas scrubber 800, a second portion of the sorbent material becomes saturated with the halogen containing process gases 101 resulting in the formation of a second spent portion of the sorbent material. The process continues until there is only a small, unused portion of the last portion 806-n remaining. The horizontally oriented interdigitated walls 816 force the process gases 101 to flow in two directions through the sorbent material, thereby increasing the path length and the amount of sorbent material utilized in the canister 104.

FIG. 9 is a schematic diagram illustrating a gas scrubber 900 according to another embodiment. In this embodiment, horizontally oriented interdigitated walls 916 are provided only in a top portion of the canister 104, forming portions 906-1, 906-2, 906-3, etc. of sorbent material. The horizontally oriented interdigitated walls 916 force the process gases 101 to flow in at least two directions (e.g., left, right and up) through the sorbent material, thereby increasing the path length and the amount of sorbent material utilized in the canister 104.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of scrubbing halogen gas from an etching or deposition chamber comprising passing a halogen containing exhaust gas from the etching or deposition chamber through a canister containing a plurality of modular sorbent material portions each shaped in a block and at least one partition comprising a series of interdigitated walls between the respective modular sorbent material portions, such that the at least one partition in the canister forces the halogen containing exhaust gas through the sorbent material in at least two directions.

2. The method of claim 1, wherein:
the plurality of modular adsorbent material portions comprise activated carbon, calcium hydroxide, calcium carbonate, calcium oxide, calcium aluminate, aluminium hydroxide, aluminium oxide, nickel oxide, nickel carbonate, nickel hydroxide, boehmite, diatomaceous earth, attapulgite or mixtures thereof; and
the modular adsorbent material portions are selected to adsorb a halogen containing gas which comprises $SiF_4$, $SiCl_4$, $CF_4$, $Cl_2$, Bra, HBr, HI, HCl, $NF_3$, $SiH_2Cl_2$, $CH_3CCl_3$ or mixtures thereof.

3. The method of claim 1, wherein the series of interdigitated walls comprises a series of vertically oriented walls.

4. The method of claim 1, wherein the series of interdigitated walls comprises a series of horizontally oriented walls.

5. A method of scrubbing halogen gas from an etching or deposition chamber comprising passing a halogen containing exhaust gas from the etching or deposition chamber through a canister containing at least one modular sorbent material portion shaped in a block and at least one partition comprising a series of interdigitated walls, such that the at least one partition in the canister forces the halogen containing exhaust gas through the sorbent material in at least two directions, wherein the series of interdigitated walls comprises at least three horizontally oriented walls which are provided only in a top portion of the canister.

6. The method of claim 5, wherein:
the at least one modular adsorbent material portion comprise activated carbon, calcium hydroxide, calcium carbonate, calcium oxide, calcium aluminate, aluminium hydroxide, aluminium oxide, nickel oxide, nickel carbonate, nickel hydroxide, boehmite, diatomaceous earth, attapulgite or mixtures thereof; and
the modular adsorbent material portions are selected to adsorb a halogen containing gas which comprises $SiF_4$, $SiCl_4$, $CF_4$, $Cl_2$, Bra, HBr, HI, HCl, $NF_3$, $SiH_2Cl_2$, $CH_3CCl_3$ or mixtures thereof.

* * * * *